(No Model.)
W. E. P. McALISTER.
CAKE CUTTER.
No. 492,417.  Patented Feb. 28, 1893.
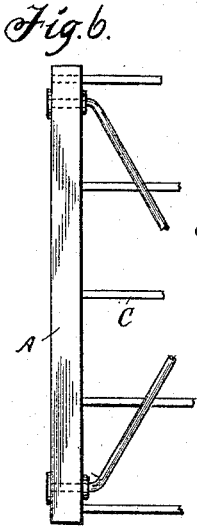
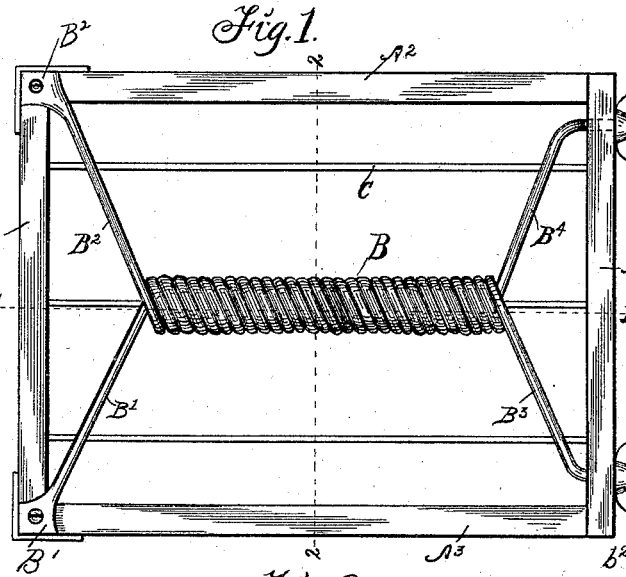
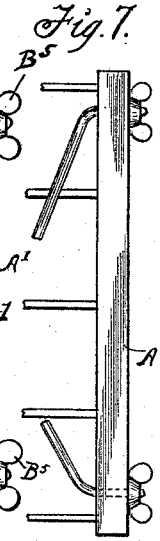
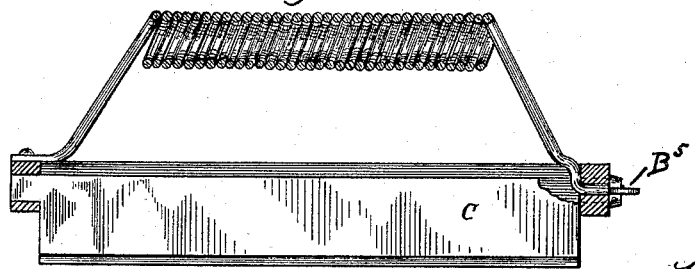
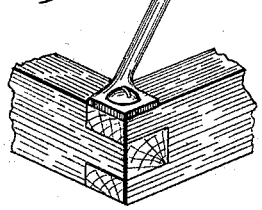
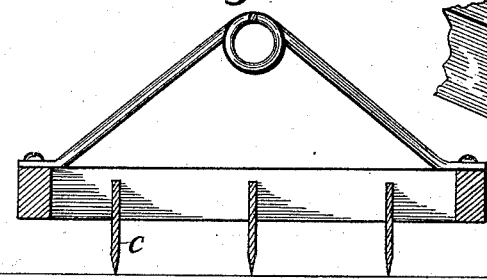
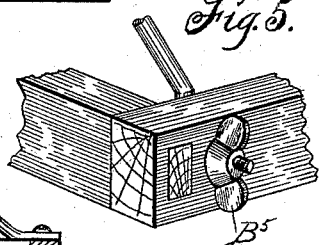
Witnesses:
W. P. Smith.
Chas B. Mait
Inventor.
Wilson E. P. McAlister.
By Higdon & Higdon Att'ys.

UNITED STATES PATENT OFFICE.

WILSON-ELLA PALMER McALISTER, OF RICHMOND, KENTUCKY.

CAKE-CUTTER.

SPECIFICATION forming part of Letters Patent No. 492,417, dated February 28, 1893.

Application filed September 3, 1892. Serial No. 444,940. (No model.)

*To all whom it may concern:*

Be it known that I, WILSON-ELLA PALMER MCALISTER, of Richmond, Madison county, Kentucky, have invented certain new and useful Improvements in Cake-Cutters, of which the following is a full, clear, and exact description, reference being had to the accompanying drawings, forming a part hereof.

My invention relates to hand cake cutters, stamping knives for blocking out dough for cakes and biscuits, and which may be used as a chopper for other culinary purposes.

The object of my invention is to produce a simple, strong, durable and inexpensive implement which may be readily disjointed and separated into several parts for sharpening the knives and for thoroughly cleansing or burnishing the same.

The invention consists in details of construction hereinafter fully described.

In the accompanying drawings, Figure 1 is a plan; Fig. 2 a central longitudinal section on the line 1—1 of Fig. 1. Fig. 3 is a transverse section on the line 2—2 of Fig. 1. Fig. 4 is an enlarged detail in perspective of one end or corner, and Fig. 5 a similar view of the other end or corner of the frame-pieces showing the method of attachment to the handle. Figs. 6 and 7 are respectively details of the end pieces of the handle connections and the modification of the plan shown in Fig. 1.

In the first five figures of the drawings, the frame consists of four pieces $A$, $A'$ $A^2$, $A^3$, $A$, $A'$ being the end pieces and $A^2$, $A^3$ the side pieces thereof, the latter being secured at one end to the end piece $A$ by tenon-joints and by screws passing through the flattened ends $B'$, $B^2$ of wires forming the handle and also passing through the tenon-joint to secure the whole, the two side pieces of the one end piece together with the handle. The opposite ends of the longitudinal frame-pieces $A^2$, $A^3$, are mortised into the end piece $A'$ and securely held thereon by the ends $B^3$, $B^4$ of the handle, which are bent to form a shoulder upon the inner side and to pass through the end piece $A'$ which is securely held upon the longitudinal frame pieces of the handle by thumb-screws $B^5$, $B^5$. The handle B is preferably formed of two pieces of wire coiled at their middle portions and entwined or wrapped closely together to form an enlarged cylindrical portion which may be comfortably and securely held in the hand.

The blades C, are reduced at their ends $c$, to fit into mortises in the end pieces $A$, $A'$ and held in place, together with the end pieces $A'$ by the handle. When it is desired to remove dried dough or cleanse the implement or sharpen the knives, the end piece $A'$ and blades C may be easily disconnected from the handle and the remaining portion of the frame by unscrewing the thumb-nuts $B^5$, and removing end piece $A$.

In the modification shown in Figs. 6 and 7 the side pieces $A^2$, $A^3$ of the frame are replaced by blades similar to the blades C described, which form the sides of the device, and the lateral cutting surface of the device is thus increased, and the implement consists solely of the handle attached securely and separably from the other, and to one of two end pieces $A$, $A'$, which end pieces connect any suitable number of longitudinal blades mortised into the end pieces to complete the structure. The form of handle shown and its mode of connection to the frame pieces is preferable as it is simple and cheap in its construction and may be easily cleansed, but other forms of handle may be used for connecting the frame pieces and blades hereinbefore described.

Having thus described my invention, what I claim as new therein, and desire to secure by Letters Patent, is—

1. A cake-cutter, comprising longitudinal side bars, an end bar rigidly connecting the side bars at one end thereof, and a removable end bar, connecting the opposite ends of the side bars, a handle connected rigidly at one end to the frame, and having longitudinally extending and threaded end portions at the opposite end, passing through the removable end bar, and retaining nuts engaging the projecting ends of said longitudinally extending portions of the handle, substantially as described.

2. In a cake-cutter, the combination of a frame, consisting of side bars, connected together rigidly at one end by an end bar having mortises therein, and at their opposite ends by a removable end bar, having mortises therein similar, and longitudinally opposite to the mortises of the rigidly connected bar, with a number of longitudinally arranged blades, connecting the end bars of the frame, and having reduced ends adapted to engage the mortises of the end bars of the frame, substantially as described.

In testimony whereof I affix my signature in the presence of two witnesses.

WILSON-ELLA PALMER McALISTER.

Witnesses:
C. L. BURNS,
E. E. McCANN.